United States Patent [19]
Pope

[11] Patent Number: 5,974,724
[45] Date of Patent: Nov. 2, 1999

[54] FISHING LURE

[76] Inventor: Edna S. Pope, P.O. Box 86 FT., McCoy, Fla. 32134

[21] Appl. No.: 08/954,462

[22] Filed: Oct. 20, 1997

[51] Int. Cl.$^6$ .................................................. A01K 85/00
[52] U.S. Cl. .......................... 43/42.26; 43/42.06; 43/42; 43/42.39; 43/42.37
[58] Field of Search ....................... 43/42, 42.37, 42.26, 43/42.38, 42.39, 42.45, 42.06

[56] References Cited

U.S. PATENT DOCUMENTS

| | | | |
|---|---|---|---|
| 208,581 | 10/1878 | Falvey | 43/42.26 |
| 1,247,955 | 11/1917 | Grube | 43/42.37 |
| 1,813,722 | 7/1931 | Wright | 43/42.26 |
| 2,129,245 | 9/1938 | Stenstrom | 43/42.26 |
| 2,218,280 | 10/1940 | Deering | 32/42.26 |
| 2,341,999 | 2/1944 | Lennington | 43/42.26 |
| 2,389,883 | 11/1945 | Worden | 43/42.26 |
| 2,819,553 | 1/1958 | Fultz | 43/42.26 |
| 3,389,490 | 6/1968 | Peters | 43/42.26 |
| 4,516,352 | 5/1985 | Firmim | 43/42.26 |
| 4,862,630 | 9/1989 | Welch | 43/42.26 |
| 4,912,871 | 4/1990 | Brady | 43/42.26 |
| 4,928,422 | 5/1990 | Pitree | 43/42 |
| 5,228,230 | 7/1993 | Vaught | 43/42.26 |
| 5,546,694 | 8/1996 | Wilkinson | 43/42.39 |

*Primary Examiner*—Kurt Rowan

[57] ABSTRACT

A fishing lure including a unitary crab shaped body member that has a plurality of legs extending from opposite sides. The crab shaped body member is formed of a flexible material. The flexible material is permeated with an attractant. The crab shaped body member and the plurality of legs are capable of up and down movement. Also, a concave weight is positioned within the crab shaped body member. Finally, a J-hook member is positioned through the crab shaped body member and has an eyelet at a first end and a barb at a second end.

1 Claim, 3 Drawing Sheets

FISHING LURE

BACKGROUND OF THE INVENTION

1. Field of the Invention

The present invention relates to a fishing lure and more particularly pertains to providing a fishing lure for attracting and catching cobia and red fish.

2. Description of the Prior Art

The use of a fishing lure is known in the prior art. More specifically, fishing lures heretofore devised and utilized for the purpose of attracting and catching fish are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,155,947 to Rivard discloses a scented fishing lure. U.S. Pat. No. 4,928,422 to Pitre discloses an artificial bait crablike fishing lure. U.S. Pat. No. 4,912,871 to Brady discloses a crab lure. U.S. Pat. No. 4,862,630 to Welch discloses a fishing lure. U.S. Des. 287,385 to Sato discloses a toy crab. Lastly, U.S. Pat. No. 4,516,352 to Firmin discloses an artificial craw fish lure with dorsal and ventral seam.

In this respect, the fishing lure according to the present invention substantially departs from the conventional concepts and designs of the prior art, and in so doing provides an apparatus primarily developed for the purpose of providing a fishing lure for attracting and catching cobia and red fish.

Therefore, it can be appreciated that there exists a continuing need for a new and improved fishing lure which can be used for providing a fishing lure for attracting and catching cobia and red fish. In this regard, the present invention substantially fulfills this need.

SUMMARY OF THE INVENTION

In view of the foregoing disadvantages inherent in the known types of fishing lures now present in the prior art, the present invention provides an improved fishing lure. As such, the Ageneral purpose of the present invention, which will be described subsequently in greater detail, is to provide a new and improved fishing lure which has all the advantages of the prior art and none of the disadvantages.

To attain this, the present invention essentially comprises a unitary crab shaped body member. The crab shaped body member has a plurality of legs extending from opposite sides of the body. The crab shaped body member has an upper body portion and a lower body portion. The crab shaped body member is formed of a flexible material. The flexible material is permeated with an attractant. The crab shaped body member and the plurality of legs are capable of up and down movement. The upper body portion has a pair of upper raised ridges that are symmetrically spaced one from the other. The lower body portion has a pair of lower raised ridges that are symmetrically spaced one from the other. The pair of upper raised ridges and the pair of lower raised ridges are capable of restricting the lateral movement of the crab shaped body member.

Additionally, a concave weight is positioned within the crab shaped body member. The concave weight is spaced from a rear side of the crab shaped body member and forces the crab shaped body member to descend downwardly when placed in water. Lastly, a J-hook member is included. The J-hook member has an eyelet at a first end and a barb at a second end. The J-hook is positioned through the crab shaped body member and adjacent the lower body portion. The J-hook member allows the barb end and the eyelet to project outwardly from the crab shaped body member. The J-hook member is extended horizontally along a length of the crab shaped body for allowing a swimming like action when a line is tied to the eyelet.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing lure which has all the advantages of the prior art fishing lures and none of the disadvantages.

It is another object of the present invention to provide a new and improved fishing lure which may be easily and efficiently manufactured and marketed.

It is a further object of the present invention to provide a new and improved fishing lure which is of a durable and reliable construction.

An even further object of the present invention is to provide a new and improved fishing lure which is susceptible of a low cost of manufacture with regard to both materials and labor, and which accordingly is then susceptible of low prices of sale to the consuming public, thereby making such fishing lure economically available to the buying public.

Still yet another object of the present invention is to provide a new and improved fishing lure which provides in the apparatuses and methods of the prior art some of the advantages thereof, while simultaneously overcoming some of the disadvantages normally associated therewith.

Still another object of the present invention is to providing a fishing lure for attracting and catching cobia and red fish.

Lastly, it is an object of the present invention to provide a new and improved a unitary crab shaped body member that has a plurality of legs extending from opposite sides. The crab shaped body member is formed of a flexible material. The flexible material is permeated with an attractant. The crab shaped body member and the plurality of legs are capable of up and down movement. Also, a concave weight is positioned within the crab shaped body member. Finally, a J-hook member is positioned through the crab shaped body member and has an eyelet at a first end and a barb at a second end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
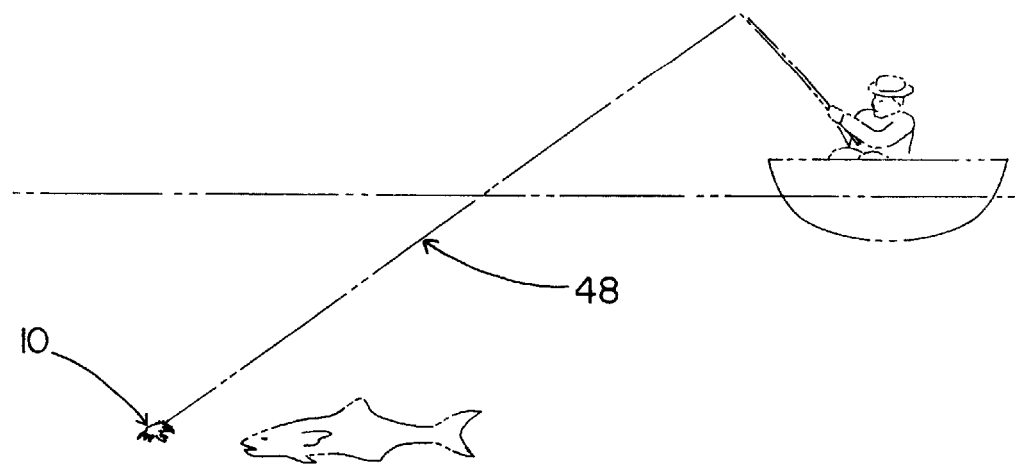
FIG. 1 is a perspective illustration of the preferred embodiment of the fishing lure constructed in accordance with the principles of the present invention.

With reference now to the drawings, and in particular to FIG. 1 thereof, a new and improved fishing lure embodying the principles and concepts of the present invention and generally designated by the reference numeral 10 will be described.

The present invention, the new and improved fishing lure, is comprised of a plurality of components. Such components in their broadest context include crab shaped body and J-hook. Such components are individually configured and correlated with respect to each other so as to attain the desired objective.

Figure 2:
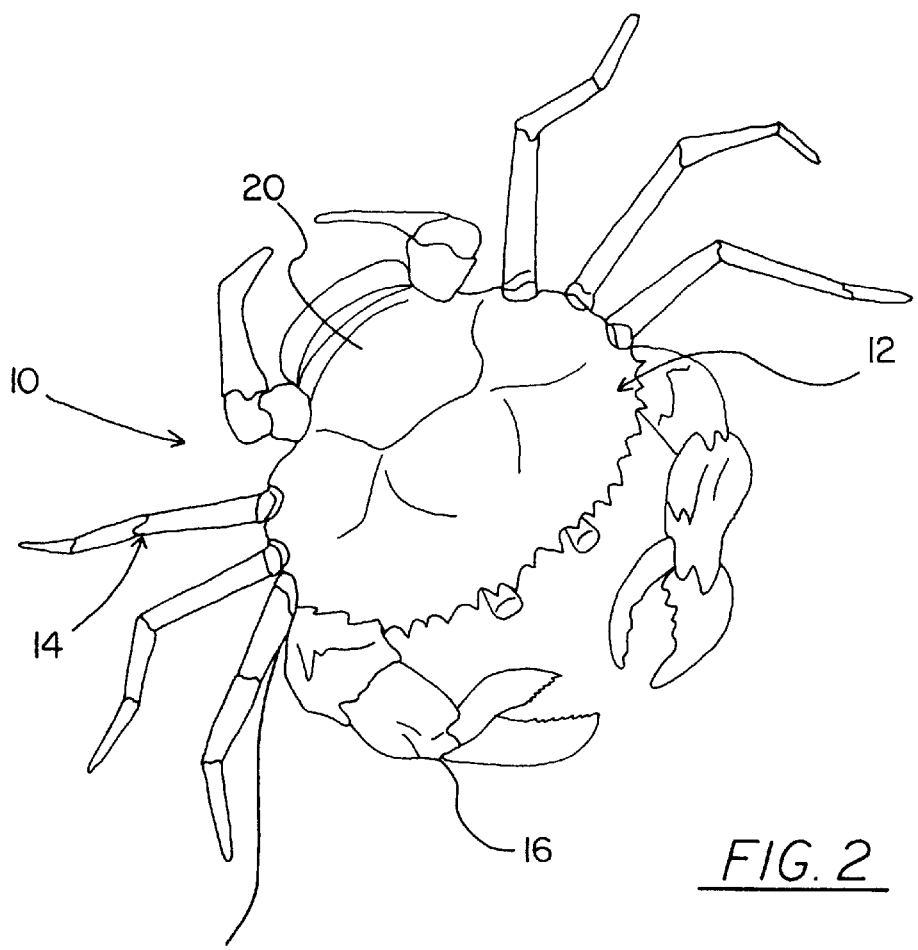
FIG. 2 is an isometric top view of the fishing lure of the present invention.
Figure 4:
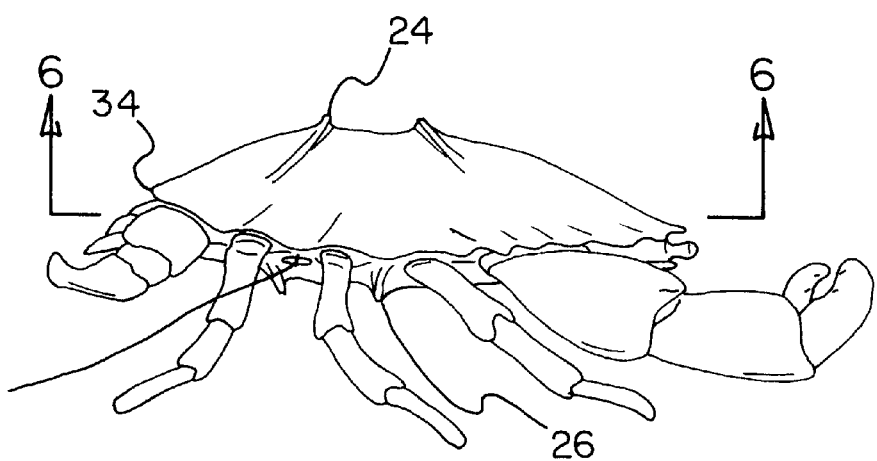
FIG. 4 is a side view of the fishing lure of the present invention.
Figure 5:
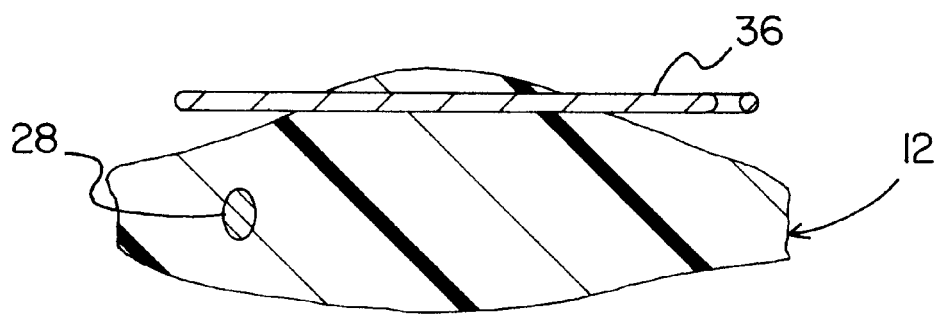
FIG. 5 is a cross-sectional view of the present invention taken along line 5—5 of FIG. 3.

More specifically, the present invention includes a unitary crab shaped body member 12. The crab shaped body member has a plurality of legs 14 extending from opposite sides of the body. The plurality of legs are sized and shaped to look like the extremities of a live crab. The plurality of legs include the claws 16, as seen in FIG. 2. The crab shaped body member has an upper body portion 20 and a lower body portion 22. The crab shaped body member is formed of a flexible material, preferably rubber. The flexible material is permeated with an attractant that has the aroma of a crab or other crustacean. The crab shaped body member and the plurality of legs are capable of up and down movement when placed in water. The upper body portion has a pair of upper raised ridges 24 that are symmetrically spaced one from the other, as shown in FIG. 4. The lower body portion has a pair of lower raised ridges 26 that are symmetrically spaced one from the other, as depicted in FIG. 4. The pair of upper raised ridges and the pair of lower raised ridges are capable of restricting the lateral movement of the crab shaped body member. Restricting the lateral movement keeps the crab shaped body member from moving from side to side as it descends down into the water.

Figure 6:
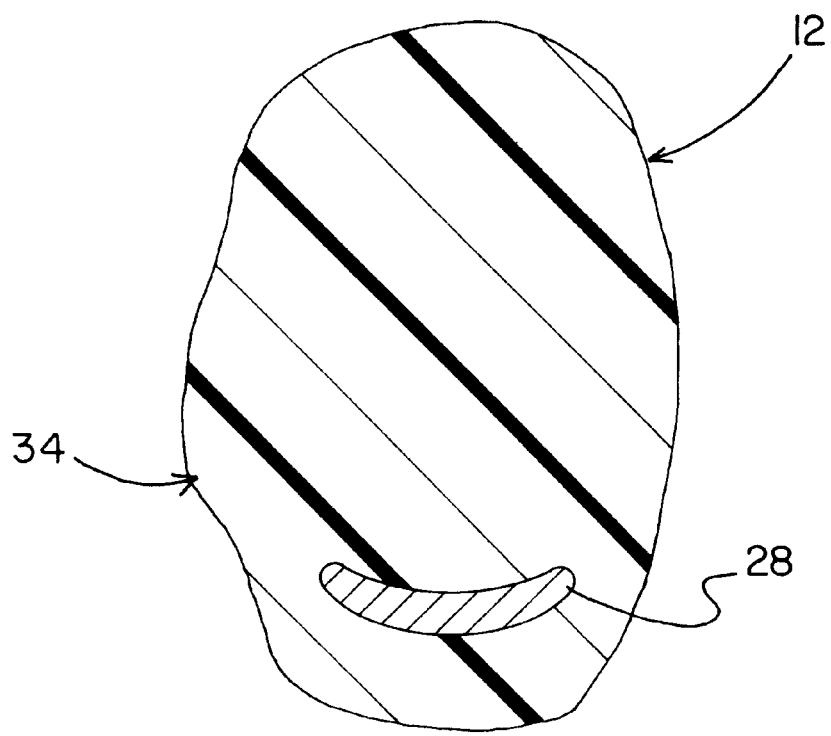
FIG. 6 is a cross-sectional view of the present invention taken along line 6—6 of FIG. 4.

Additionally, a concave weight 28 is positioned within the crab shaped body member. The concave weight, of FIG. 6, is spaced from a rear side 34 of the crab shaped body member and forces the crab shaped body member to descend downwardly when placed in water.

Figure 3:
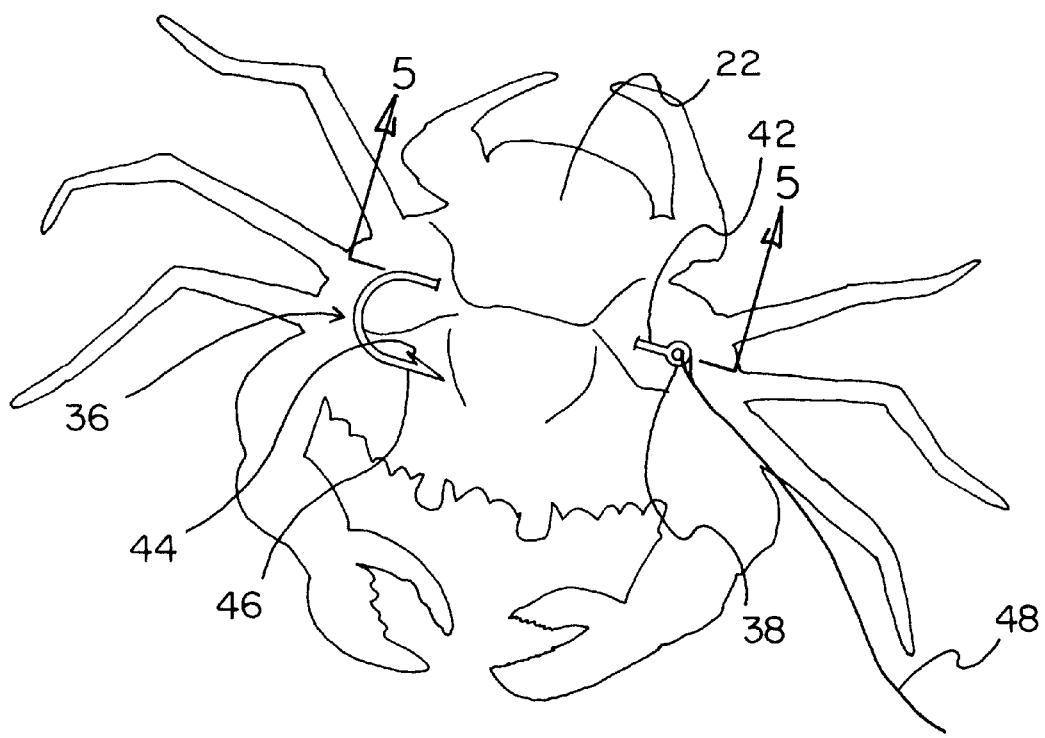
FIG. 3 is a rear isometric view of the fishing lure of the present invention.

Lastly, a J-hook member 36 is included. The J-hook member has an eyelet 38 at a first end 42 and a barb 44 at a second end 46. As best illustrated in FIG. 3, the J-hook is positioned through the crab shaped body member and adjacent the lower body portion 22. The J-hook member allows the barb end and the eyelet to project outwardly from the crab shaped body member. The J-hook member is extended horizontally along a length of the crab shaped body for allowing a swimming like action when a line 48 is tied to the eyelet. In FIG. 1, the crab shaped body member is shown suspended in water with the fisherman holding onto the line.

The present invention fishing lure is a crab shaped lure for attracting and catching cobia and red fish. The present invention is pre-molded out of a rubber that has been permeated with an attractant. The present invention is created in a variety of colors and sizes. The present invention has a J-hook and line located on the under side of the body, along with an implanted weight. The upper body portion and the lower body portion, each have a pair of raises ridges.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing lure for attracting cobia and red fish comprising, in combination:

a unitary crab shaped body member having a plurality of legs extending from opposite sides thereof, the crab shaped body member having an upper body portion and lower body portion, the crab shaped body member being formed of a flexible material, the flexible material being permeated with an attractant, the crab shaped body member and the plurality of legs are capable of up and down movement, the upper body portion having a pair of upper raised ridges being symmetrically spaced one from the other, the lower body portion having a pair of lower raised ridges being symmetrically spaced one from the other, the pair of upper raised ridges an the pair of lower raised ridges being capable of restricting the lateral movement of the crab shaped body member;

a concave weight being positioned within the crab shaped body member, the concave weight being spaced from a rear side of the crab shaped body member and forces the crab shaped body member to descend downwardly when placed in water; and a J-hook member having an eyelet at a first end and a barb at a second end, the J-hook member being positioned through the crab shaped body member generally parallel to said upper and lower raised ridges and adjacent the lower body portion, the J-hook member allowing the barb end and the eyelet to project outwardly from the crab shaped body member, the J-hook member being extended horizontally along a length of the crab shaped body remote from the concave weight for allowing a swimming action when a line being tied to the eyelet.

\* \* \* \* \*